United States Patent
Yau

(10) Patent No.: US 6,741,688 B1
(45) Date of Patent: May 25, 2004

(54) METHOD AND APPARATUS FOR HANDLING TELEPHONE CALLS

(75) Inventor: Hunyue Yau, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/429,228

(22) Filed: Oct. 28, 1999

(51) Int. Cl.$^7$ .............................. H04M 1/56; H04M 3/42
(52) U.S. Cl. .............................. 379/142.01; 379/207.15
(58) Field of Search ...................... 379/142.01–142.07, 379/207.14, 207.15, 201.01

(56) References Cited

U.S. PATENT DOCUMENTS

| | | | | |
|---|---|---|---|---|
| 4,277,649 A | * | 7/1981 | Sheinbein | 379/197 |
| 5,274,698 A | * | 12/1993 | Jang | 379/198 |
| 5,276,731 A | * | 1/1994 | Arbel et al. | 379/100.13 |
| 5,651,053 A | * | 7/1997 | Mitchell | 379/142.01 |
| 5,680,442 A | * | 10/1997 | Bartholomew et al. | 379/210.02 |
| 5,809,125 A | * | 9/1998 | Gammino | 379/189 |
| 5,812,650 A | * | 9/1998 | Gammino | 379/189 |
| 5,875,240 A | * | 2/1999 | Silverman | 379/133 |
| 5,953,406 A | * | 9/1999 | LaRue et al. | 379/201.01 |
| 6,134,320 A | * | 10/2000 | Swan et al. | 379/142.01 |
| 6,289,084 B1 | * | 9/2001 | Bushnell | 379/192 |

* cited by examiner

Primary Examiner—Ahmad F. Matar
Assistant Examiner—Hector Agdeppa
(74) Attorney, Agent, or Firm—Marger Johnson & McCollom, P.C.

(57) ABSTRACT

An electronic method and apparatus for handling telephone calls is described. The method includes storing in a memory a telephone number template. The template preferably is as wide as a telephone number is long and identifies one or more telephone number digits by the digit positions within a telephone number field for comparison purposes. The method further includes monitoring a telephone line for a call placed thereon, identifying at least one of the origin and the destination telephone number and storing one or more digits of such identified telephone number in a memory. The method further includes comparing the stored digits of the identified telephone number with the corresponding digits of the stored template. Finally, the method includes processing the call based upon the result of said comparing. Such processing may include any one or more of logging, filtering, blocking, ignoring, rerouting, forwarding, distinctive-ringing and answering the call. In accordance with one aspect of the invention, the template includes a first-level mask-identifying digit position criterion that identifies dialing tokens of interest and a second-level target-identifying digit content criterion that attempts to pattern match those tokens of interest with corresponding tokens of stored telephone numbers.

22 Claims, 3 Drawing Sheets

METHOD AND APPARATUS FOR HANDLING TELEPHONE CALLS

BACKGROUND OF THE INVENTION

This invention relates to telephone systems and more particularly to a method of handling telephone calls by screening the origin and/or destination telephone number and logging, rerouting, forwarding, distinctive-ringing and/or answering the calls based upon prescribed screening criteria.

Prior art screening methods focus on prefix telephone number tokens such as 0, 1, 9, 10-10 or area codes and exchanges and route or reject calls based on the first one or more recognized tokens. Routing or rejection of such broad categories of calls typically occurs in real time response to dialing by the call originator. Examples would include routing of a call with a 9 prefix followed by seven numbered tokens from an internal line where the call originator must first dial a 9 to get an outside line and rejection of any call with a 1-900 prefix on long distance-restricted lines.

A so-called dial plan mapper has been proposed in which missing tokens automatically may be pre-appended ('prepended') when the mapper recognizes that a call originator has omitted a needed token. For example, a 9 may be pre-pended to seven numbered tokens dialed in error by a call originator who forgets to 'dial out.' The proposed mapper may also reject a call when the mapper detects a prefix token sequence, e.g. 1-976, that represents an unauthorized use of a telephone line. Such a dial plan mapper is described in co-pending U.S. patent application Ser. No. 09/219,182 entitled DIAL PLAN MAPPER filed Dec. 22, 1998 and assigned in common with the present application to Cisco Technology, Inc. The disclosure of the DIAL PLAN MAPPER patent application is incorporated herein by this reference.

The dial plan mapper uses what is referred to as a regular expression, longest dial string match criterion and acts immediately when the longest string match is made. While the dial plan mapper technique is quick, it lacks specificity and thus does not comprehend rejecting, for example, a particular 1-800 number while routing, or call-completing, another. This is because the dial plan mapper attempts to find a match as each token is received and upon a longest dial string match, effectively stops monitoring the line for further token entries. The reject-upon-a-match technique can confuse auto-dialers and other special-purpose telephone equipment, which may expect an entire string of tokens to be acknowledged by the PSTN.

The dial plan mapper technique requires storage of every possible match dial string, although trailing tokens representing a four digit extension may be treated by the match string logic as don't cares. Thus, every explicit match target must be represented by a stored match pattern unless the match dial string is a prefix such as 0, 8 or 9 or a leading token string such as an area code or exchange. Enumerating each and every desired match requires a lot of memory to store the match patterns. Prefix-based screening lacks specificity, since specifying a 1-800 prefix match pattern will result in all 1-800 calls being filtered or blocked, for example, when it may be desired to filter or block only particular 1-800 calls. Postfix-based screening is impossible using the dial plan mapper technique.

SUMMARY OF THE INVENTION

An electronic method and apparatus for handling telephone calls is described. The method includes storing in a memory a telephone number template. The template preferably is as wide as a telephone number is long and identifies one or more telephone number digits by the digit positions within a telephone number field for comparison purposes. The method further includes monitoring a telephone line for a call placed thereon, identifying at least one of the origin and the destination telephone number and storing one or more digits of such identified telephone number in a memory. The method further includes comparing the stored digits of the identified telephone number with the corresponding digits of the stored template. Finally, the method includes processing the call based upon the result of said comparing. Such processing may include any one or more of logging, filtering, blocking, ignoring, rerouting, forwarding, distinctive-ringing and answering the call. In accordance with one aspect of the invention, the template includes a first-level mask-identifying digit position criterion that identifies dialing tokens of interest and a second-level target-identifying digit content criterion that attempts to pattern match those tokens of interest with corresponding tokens of stored telephone numbers.

DETAILED DESCRIPTION OF THE PREFERRED EMBODIMENT

Telephone call as used herein refers broadly to any use, whether voice or data or both, of the public switched telephone network (PSTN) or other customer-premised equipment (CPE) such as a PBX whereby a person or machine dials a telephone number to talk to someone or to send information electronically. Telephone call screening as used herein refers broadly to examining a telephone call as regards the call originating telephone number and/or its call destination telephone number to determine whether special handling is indicated, in accordance with prescribed screening criteria. Telephone call routing as used herein refers broadly to paging, switching, connecting, forwarding or otherwise putting through ('answering', connecting) the call whether to the dialed call destination telephone number or another. Address as used herein refers broadly to a telephone number, network access server, Internet service provider (ISP), e-mail address or any other origin-identifying or destination-identifying means.

Thus, the invention very broadly is applicable to addressing voice, data or electronic mail via a telephone, a computer, a network node, an e-mailbox, a bulletin board, a facsimile machine, a pager or other device or system.

Figure 1:
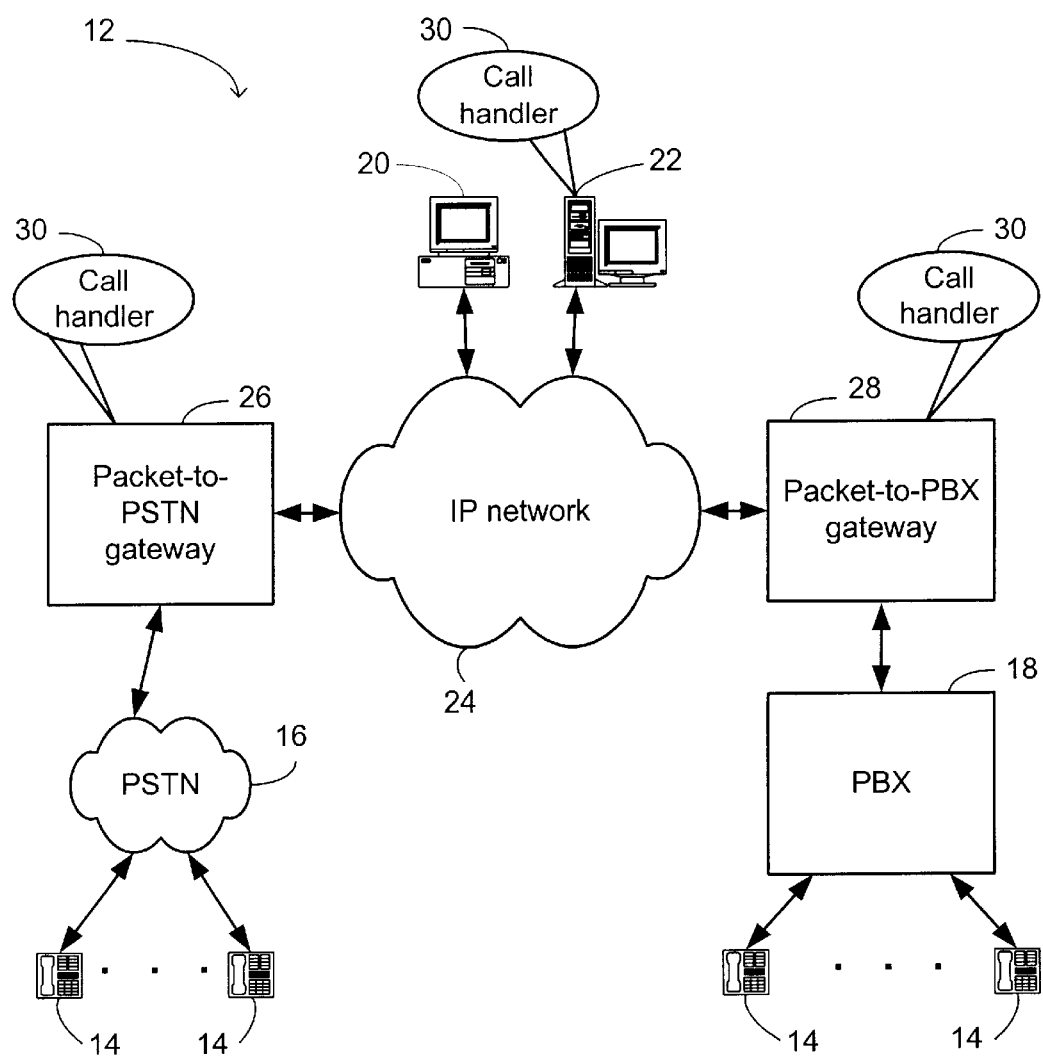
FIG. 1 is a system block diagram of a voice-data network utilizing the method in accordance with the invention.

FIG. 1 is a diagram of a telephone system 12 that includes multiple telephone handsets 14 connected to a public or private telephone network such as PSTN 16 or PBX 18. An Internet Protocol (IP) telephone 20 uses a gatekeeper 22 to direct telephone calls over an IP network 24. A packet-to-PSTN gateway 26 is used to transfer calls between PSTN 16 and IP network 24. A packet-to-PBX gateway 28 is used to transfer calls between PBX 18 and IP network 24. A call handler 30 according to the invention is located in one or more of the different gateways 26, 28 and gatekeeper 22 to efficiently route calls between different destinations for telephones 14, 20.

Call handler 30 may be integrated into a variety of existing IP hosts such as voiceover IP (VOIP) routers, Voice over Frame Relay (VOFR) routers, H.320/H.323 gateways and Internet Operating System (IOS) access-list routers. Other types of telephone systems connected to IP network 24 may also use call handler 30, within the spirit and scope of the invention. Call handler 30 provides more flexible and configurable address-screening or telephone call-screening capability than existing products and systems.

Figure 2:
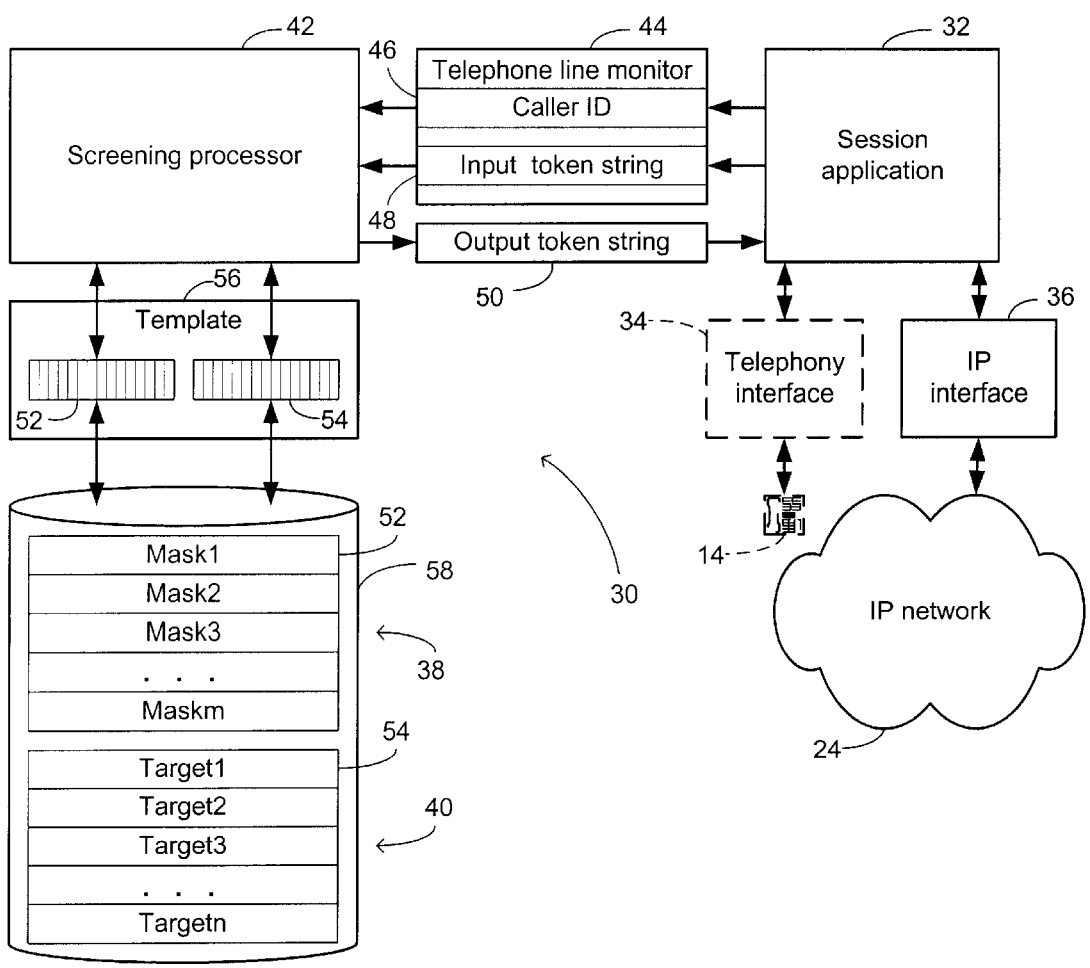
FIG. 2 is a detailed block diagram of the telephone call-handling apparatus in accordance with the invention.

FIG. 2 is a detailed diagram of gatekeeper 22 or either of gateways 26, 28 of telephone system 12. Gatekeeper 22 and gateways 26, 28 all include a session application 32 that responds to telephone calls arriving from IP network 24 via IP interface 36. Session applications may comprise an integrated voice response system or a telephone call-routing system. These session applications generally are well known and therefore will not be described in further detail.

Those of skill in the art will appreciate that FIG. 2 very simply illustrates that gatekeeper 22 of FIG. 1 is like gateways 26, 28 of FIG. 1 except that gatekeeper 22 includes no telephony interface 34, shown in phantom lines. Gatekeeper 22 processes gatekeeper-routed signaling by sending received telephone calls back out over IP network 24 or by passing the translated signaling from call handler 30 back to the source IP phone 20 (refer to FIG. 1) or the gateway which is the source of the call.

In the case of gateways 26, 28 (refer to FIG. 1), telephones 14 are coupled directly or through a PSTN 16 or PBX 18, etc. via a telephony interface 34 to session application 32.

Telephony interface 34 includes whatever circuitry abstracts the signaling part of the telephony hardware attached to the gateway. Session application 32 provides any call translation that is required between telephony interface 34 and IP interface 36.

Referring still to FIG. 2, the apparatus of the invention preferably takes the form of a call handler 30. Call handler 30 includes an address mask database 38 and an address target database 40 stored in memory. Call handler also includes a screening, or call, processor 42 operatively coupled with databases 38, 40 and with session application 32. In accordance with the invention, screening processor 42 receives source telephone numbers and input dial sequences from session application via a telephone line monitor 44. The source telephone numbers are temporarily stored in Caller ID buffer 46. The input dial sequences are temporarily stored in input token string buffer 48. Screening processor 42 then screens the source telephone numbers and the received input dialing sequences in accordance with prescribed criteria based upon mask database 38 and target database 40. Finally, screening processor 42 selectively transmits telephone numbers or output dial sequences back to session application 32 via an output token string buffer 50. One or more entries within database 38 and one or more entries within database 40 may be referred to collectively herein as an address template or screen.

Address mask database 38 includes one or more address or telephone number masks 52 that preferably are as wide as any received telephone number may be long, i.e. it may be as wide as fifteen tokens in accordance with the E.164 international addressing standard. An address mask identifies those positions within the field of tokens that are deemed significant for screening purposes. For example, an address mask useful in screening 1-800 and 1-900 calls would be the hexadecimal number FFFF0000000 (h) (typically stored in memory in binary form). It will be understood that the F's represent 'on' or high-active bit fields corresponding to the 1-800 and 1-900 prefix to a traditional seven-digit phone number represented by the 0's. Such a mask when ANDed with a received telephone number identifies only the four prefix tokens as being significant for screening purposes.

Address target database 40 includes one or more address or telephone number targets 54 that preferably are also as wide as any received telephone number may be long. An address target identifies only within those significant positions determined by masking which tokens or token fields are targeted for screening. For example, an address target useful in screening 1-800 and 1-900 calls would be the decimal numbers 18000000000 and 19000000000, respectively (typically stored in memory in binary coded decimal or ASCII form). The output of the address-masking process next may be compared with one or more address targets. In the example given here, the singular masking result (the ANDed output of the masking) is compared with two different targets. The result of the comparison identifies whether the received telephone number is either of 1-800-xxx-xxxx or 1-900-xxx-xxxx (where x's denote don't cares).

One or more masks 52 and one or more targets 54 are referred to herein as a screen or template 56. It may be seen from FIG. 2 that template 56 represents a two-level logic device for screening telephone numbers monitored by telephone line monitor 44 to determine how the telephone call should be handled by screening processor 42. Template 56 is so called because of its comprehension of both token position and token contents of the telephone number being screened. Template 56 thus defines one or more position sub-fields within a telephone number-wide token field that represent token positions of interest (via one or more masks 52). Template 56 further defines content sub-fields of interest (via one or more targets 54) corresponding with those masked-in position sub-fields that represent telephone number pattern targets.

Thus, 1-800 and 1-900 prefixed telephone calls may be processed in accordance with prescribed criteria. For example, the received call may be logged, screened, ignored, rerouted, forwarded to another number, answered with a recorded message, or passed back to session application 32 as an output dial sequence thereby permitting the 1-800 or 1-900 call to be completed. Those of skill in the art will appreciate that logging typically would include recording in a memory, for example, the time and date of the attempted telephone call, the number dialed by the originator of the call and the originator's telephone number. Such logging can be accompanied by immediate or periodic statistical analysis and reporting.

Another example illustrates important advantages of call handler 30 according to the invention. If it is desired to screen only 1-976 calls, then the same address mask FFFF0000000 (h) may be used, but a different address target of 19760000000 would be used. The broad categories of 1-800 and 1-900 prefixed telephone calls would not be screened in such a case, but all 1-976 calls would be screened.

The flexibility of configuring screening templates in accordance with the invention thus becomes clear.

Yet another example would screen only for one or two specific telephone numbers, e.g. 1-976-123-4567 and 1-976-123-4568. The address mask would be stored as FFFFFFFFFFF(h) and the address targets as 19761234567 and 197612345678. It may be seen that the address mask indicates that each and every token within the token field is significant. Thus all tokens are passed from through the mask logic to the pattern match logic where the two particular address targets are compared with the destination telephone number. A match with either pattern stored in memory as determined by the pattern match logic might indicate a match and the call is thus screened as desired.

Yet a third example illustrates how the invention makes it possible to perform postfix-based telephone call handling. Assume it is desired to screen all telephone calls destined for 1-xxx-555-1212 (where x indicates a don't care), and to reroute, or forward, such calls to the new domestic 411 information clearing house number. The form of the destination telephone number, which may be referred to herein as a template, thus is 1-xxx-555-1212. A prefix-based telephone number mapping scheme such as that of the dial plan mapper would be unequipped to screen and forward such calls because of its focus on longest dial string matching and earliest possible decision making. Call handler 30 on the other hand can perform such a screen and forward requirement by building a template as described and illustrated herein. The stored template for screening purposes would include a stored 0000FFFFFFFF (h) mask and a stored 555-1212 target. Call handler 30 would use the output product 0000555-1212 (h) of the masking step to compare with the 555-1212 target and would forward the call automatically to 411 (as by simply dialing 411 and connecting the caller).

Referring still now to FIG. 2, those of skill in the art will appreciate that one or both of the mask logic and the target-match logic may be multi-layered, as in the example whereby the pattern match logic compares the destination address with not one but two address targets. Such multiple comparisons may of course be done in either order, within the spirit and scope of the invention. Also within the spirit and scope of the invention, multiple masks may be used in the first masking phase, in any desired order. Such multi-layered or multi-leveled mask and match steps will be referred to herein as chaining. The flexibility and simplicity of the logic of call handler 30 is apparent from the following call-processing pseudo-code (where m is the number of masks 52 within mask database 38 and n is the number of targets 54 within target database 40):

process calls
for all m
for all n
if masked-in sub-field(s)$_m$ =targeted sub-field(s)$_n$ then screen calls, where m is the number of masks, n is the number of targets, where a masked-in sub-field(s)$_m$ represents the positive-true ANDed product of the incoming telephone call and the mth stored mask and where a targeted sub-field(s)$_n$ represents the corresponding token sub-field(s) of the target that correspond with the identified token sub-field(s) of the mask.

Those of skill in the art will understand that the above illustrative pseudo-code implements an n * m order search, covering the most general case where masks and targets are not necessarily paired. In other words, the above process describes would handle a case in which there are m masks, n masks and no requirement that m =n. It will be appreciated that alternative implementations would have masks and targets paired in one-to-one correspondence, in which case a simplified n order search is performed by screening processor 42. The processing overhead (which impacts call-processing speed) of the more general solution to the call handling problem may be compensated for by the call handling flexibility provided by the n * m order search logic. Such tradeoffs between flexibility and speed are contemplated, and are within the spirit and scope of the invention.

Those of skill in the art also will understand that conflicts between the action to be taken by screening processor 42 most preferably are avoided by defining the templates such that there is only one action indicated for any instant telephone call handled by apparatus 30. Alternatively, screening processor 42 may have conflict resolution logic that resolves conflicting actions to be taken, e.g. one match indicates call forwarding and another match with the same source or destination telephone number indicates call blocking. For example, decision logic programmed into screening processor 42 may have a built-in hierarchy by which, for example, its action is to block rather than forward a call in a case where both are indicated, e.g. there are two matches between a template and a source or destination telephone number. Thus, conflict avoidance and/or resolution may form a part of call handler 30, within the spirit and scope of the invention.

The simplicity of the call processing and optional screening logic of the invention thus is illustrated (although it will be appreciated that the indexing of m and n may be reversed, or different mask-and-target decisional logic altogether may be used, within the spirit and scope of the invention).

Referring still to FIG. 2, telephone call-handling apparatus, or call handler 30, may be understood to include a telephone line monitor 44 for determining at least one of a source and destination telephone number for a telephone call. Call handler 30 further may be understood to include a storage device, e.g. a disk drive, 58 for storing the at least one of the source and destination telephone number. Call handler 30 also includes a template 56 stored in a memory storage device for pattern matching with the at least one stored telephone number. Template 56 preferably includes one or more masks 52 (that make up address mask database 38) for defining one or more sub-fields of interest in the stored telephone number. Template 48 further preferably includes one or more corresponding sub-fields of one or more stored telephone numbers 54 (so-called telephone number 'targets' that make up address target database 40) for comparing with the one or more sub-fields defined by the masks to be of interest. Finally, call handler 30 includes a call processor 42 coupled with template 56 for selectively processing the telephone call based upon the result of such definition and comparison.

It will be appreciated that template 56 may include a mask 52 and a corresponding target 54 that are paired one-to-one, as suggested by the illustration in FIG. 2. Such pairing of mask and target provides a simple mechanism for screening in accordance with the invention, as in the 1-xxx-555-1212 example given above wherein there is a one-to-one correspondence between mask and target. Plural mask-and-target pairs representing a single template 56 would then be stored in memory 58 with a specific, paired relation therebetween. More preferably, and more flexibly, a specific one of plural masks may correspond with plural targets, as in the 1-800, 1-900 and 1-976 or the 1-976-123-4567 and 1-976-123-4568 examples given above wherein there is one-to-three or one-to-two correspondence between masks and targets, respectively. Conversely, a specific one of plural targets may correspond with plural masks, wherein there may be a two-to-one or three-to-one correspondence between masks and targets.

It also will be appreciated that call processing may rely upon screening attributes also stored within storage device 58. Such screening attributes may be associated with a particular mask 52 and thus may be stored along with the associated mask in mask database 38. Such screening attributes may instead be associated with a particular target 54 and thus may be stored along with the associated target in target database 40. The screening attributes would instruct screening processor 42 which action, if any, to take upon a match. For example, the attribute corresponding with the 1-xxx-555-1212 example given above might be stored with the 0000FFFFFFF (h) mask or the 555-1212 target and would contain a code, e.g. a stored bit field, that designated call forwarding to 411. Screening processor 42, upon detection of a match based upon its comparison of both mask and target with an incoming 1-xxx-555-1212 would recognize the stored code as a call-forwarding screening attribute that specifies that the incoming call is to be forwarded to 411.

Another embodiment of the invention would have templates 56 stored within storage device 58 implicitly designate an action to be taken by screening processor 42 upon a match. In other words, the templates in accordance with such an embodiment need not store any screening attribute, but may be understood via a screening protocol that resides within screening processor 42 to require a particular action upon detection of a match with a particular template. By this organization of screening processor 42 and templates 56, a first set of templates may be treated as blocking templates, another set of templates may be treated as logging templates, etc.

Figure 3:
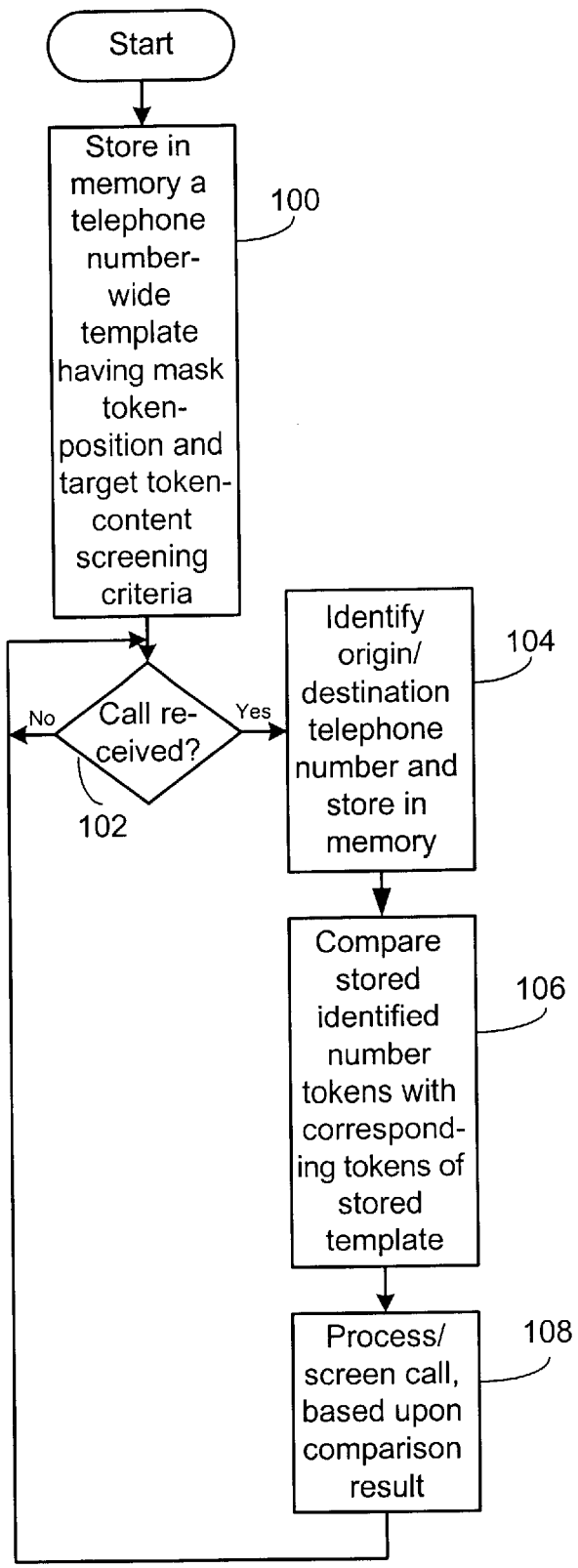
FIG. 3 is a flow chart illustrating the method in accordance with the invention.

FIG. 3 is a flow chart of an electronic telephone calls-handling or call-screening method in accordance with the invention. The method, preferably for use in a PSTN, includes storing (100) a telephone number or address template in memory, the template being as wide as a telephone number is long. The template identifies one or more telephone number digits or tokens by the digit positions within a telephone number field for comparison purposes. The template may be thought of as representing one or more dialing patterns to which the dialing sequence may be compared. The method further includes monitoring (102) a telephone line for a call placed thereon, e.g. for entry by a caller of a destination telephone number. The method further includes identifying (104) at least one of the origin and the destination telephone numbers and storing one or more digits of such identified telephone number in a memory. The one or more digits of the identified telephone number preferably includes the entire dialing sequence represented in memory as a field of ordered dial tokens.

The method further includes comparing (106) the stored digits, e.g. the field or ordered dial tokens, of the identified telephone number with the corresponding digits of the stored template.

Finally, the method further includes processing (108) the call based upon the result of the comparing, wherein the processing preferably includes screening the call if there is a match between the stored dialing sequence and at least one stored dialing pattern. Otherwise, the monitoring, storing, comparing and processing-by-selective-screening steps are continued.

Processing 108 may involve screening, by which is simply meant selective processing or processing within defined selection criteria to achieve desired goals. The call typically would be screened if there is a match between the stored dialing sequence and at least one stored dialing pattern. Those of skill in the art will appreciate that screening is used in its broadest possible sense. Thus, the screening process may include one or more of logging, filtering, blocking, ignoring, rerouting, forwarding, distinctive-ringing and answering the call. Post-processing steps also may be taken, within the spirit and scope of the invention. For example, logging may take place regardless of the outcome of screening that may result in other steps being taken. In this way, all calls may be analyzed and optionally reported at least as to source and destination telephone numbers depending upon the desired degree of control over and above simple call monitoring. More typically, logging is selective based the comparing, and results in storage in a memory of one or both of the origin and destination telephone numbers involved in the outgoing or incoming call.

Preferably in accordance with the invention, the comparing includes masking one or more prescribed don't-care dialing token sub-fields and pattern-matching one or more complementary dialing token sub-fields of the stored dialing sequence. The method in accordance with the invention may further include the following steps relating to the use of caller ID or its functional equivalent. Call handler 30 may determine the called ID associated with the telephone call originator and may store the caller ID in a memory device as a field of ordered caller ID tokens. Call handler 30 then may compare the stored field of ordered caller ID tokens with one or more caller ID patterns stored in a memory device. Such caller ID patterns previously stored may be a list of proscribed callers of a given class, e.g. telephone solicitors, or may be simply be a list of unrelated individuals, e.g. one or more persona non grata. If there is a match between the stored caller ID field and at least one stored caller ID pattern, then the call may be screened, e.g. filtered or blocked. Otherwise, call handler continues the monitoring, storing, comparing and selective screening of calls.

Those of skill in the art will appreciate that the comparing step described immediately above may be performed in accordance with the invention by the use of a masking and pattern-matching step. For example, call handler 30 may mask one or more prescribed don't care caller ID token sub-fields and pattern-matching one or more complementary caller ID token sub-fields of the stored caller ID. By complementary is meant those tokens of interest that emerge from the mask, which will be understood effectively to eliminate don't care caller ID token sub-fields from the remaining caller ID token sub-fields of interest for pattern-matching purposes.

The term "entire" as used in connection with dialing sequence or telephone number will be understood not to limit the invention to a case in which a 15-token number is entered by the telephone caller and call handler 30 monitors, stores and/or compares all fifteen tokens. Instead, it will be understood that the entire dialing sequence is stored, however long it is. In other words, an entire dialing sequence is simply a complete dialing sequence as may be determined from entry of a sequence-terminating or last token in a dialing sequence of any length. In an internal telephone network, such a sequence may be as short as two, three or four digits representing an extension.

In a local external telephone network, such a sequence may be seven digits. In a domestic long-distance telephone network, such a sequence may be eleven digits. In an international telephone network, such a sequence may be as long as fifteen or more tokens or digits. Awaiting entry of the entire dialing sequence by the call originator enables call handler 30 to process the telephone call with a greater amount of flexibility than is possible with prior art call-handling method and apparatus. Thus, dialing sequences of any length are contemplated by, and are within the spirit and scope of, the invention.

The invention may be described as a method of screening phone calls including three steps. First, call handler 30 monitors a telephone call and stores in memory an entire dialing sequence of ordered dialing tokens as a dialing token field. Next, call handler 30 classifies the telephone call by analyzing dialing token sub-fields within the stored dialing token field. Finally, call handler selectively processes the telephone call based upon the classification.

The processing step may include any one or more of blocking, filtering, routing, forwarding, distinctive-ringing and answering the call, as described. Preferably, the analyzing step involves masking the dialing token field to identify dialing token sub-fields of interest and comparing the dialing token sub-fields with telephone number targets stored in memory. Thus the invented method may be understood to involve classifying, or grouping, call-originating or call-destined telephone numbers based upon an entire dialing sequence of telephone digits or tokens. More versatility in screening telephone calls is possible with the present invention than is possible with schemes that analyze only a few leading digits or tokens of a telephone number, as with the dial plan mapper described above.

FIG. 2 shows in some detail the stored template 56 that is used for screening telephone numbers in accordance with the invention. Template 56 may be seen to include a mask-identifying digit position criterion, or mask, 52 and a target-identifying digit content criterion, or target, 54. Thus, template 56 is a two-level or two-phase template containing both a digit position criterion, or mask 52, and a digit content criterion, or target 54. The mask-identifying digit position criterion represents a telephone number mask that identifies digits of interest by their position in the telephone number. The target-identifying digit content criterion represents one or more telephone targets that enumerate content-defined digits within particular origin or destination telephone numbers. In accordance with the invention and as described generally as pattern matching, a telephone number is first masked and then the digits determined by masking to be of interest second are compared with the one or more telephone number targets, as in the examples described above.

Call processor 42 forms a logic combination between caller ID 46 (representing the call-originating or source telephone number or address) or token string 48 (representing the call-destined or destination telephone number or address) and a mask 52. Call processor 42 then uses the product of the logic combination, e.g. the AND product, to identify token positions of interest in call screening. Finally, call processor 42 compares the masked-in sub-field(s) containing tokens of interest, e.g. those one or more sub-fields corresponding with F (h) in mask 52, with one or more targets 54. A decision how to process the pending call then is made by call processor 42. For example, call processor may determine that the destination telephone number ends in 555-1212, in which case it may call-forward the call originator to the information exchange by outputting 411 via output token string buffer 50. Session application 32 then dials the number and connects the caller with information via telephony interface 34. It will be understood that call forwarding is only an exemplary one of the numerous uses to which call handler 30 may be put, in accordance with the invention.

It may be determined by call processor 42 that neither caller ID 46 nor input token string 48 has any token of interest, in which case call processor 42 may simply output input 25 token string 48 to session application via output token string buffer 50. Session application then would simply answer, or connect, the call as dialed via either telephone interface 34 or IP interface 36. Alternatively, call processor 42 may determine that one or more of caller ID 46 and input token string 48 contains one or more tokens of interest, i.e. tokens that meet the positional criteria of one or more masks 52 in mask database 38. Nevertheless, the product 30 output by the logic combination may not match any target within target database 40. In such a case, call processor 42 does nothing more than output the input token string to complete the call. Thus, screening of a call may involve nothing more than determining that the call should be placed as dialed.

Thus it is determined whether the digits of interest in the origin or destination telephone number and the corresponding digits of one of the telephone number targets are identical, and the pattern matching step in accordance with the invention is complete. In accordance with one aspect of the invention, only if they are identical is the telephone call then processed as by blocking, filtering, routing, forwarding, distinctive-ringing and answering the call. The call may further be logged by storing at least one of the origin and destination telephone numbers in a memory. The logging may be selective and may be performed, for example, only when there is such identity.

The invention thus may be described in terms of a computer-readable medium containing a program for handling telephone calls. The program includes instructions executing within call processor 42 of FIG. 2 and described in block 100 of FIG. 3. These instructions are for storing in a memory 58 a telephone number template 56. The template preferably is as wide as a telephone number is long, and it identifies, e.g. via a mask 52, one or more telephone number digits by the digit positions within a telephone number field for comparison purposes. The program further includes instructions within telephone line monitor 44 of FIG. 2 and described in blocks 102, 104 of FIG. 3. These instructions are for monitoring a telephone line for a call placed thereon, for identifying at least one of the origin and the destination telephone number and for storing one or more digits of such identified telephone number in a memory 46, 48. The program further includes instructions within screening processor 42 of FIG. 2 and described in blocks 106, 108 of FIG. 3. These instructions are for comparing the stored digits of the identified telephone number with the corresponding digits of the stored template and for processing the call based upon the result of the comparison.

Thus, those of skill in the art will appreciate that the program as described and illustrated preferably is a series of software instructions residing in a memory and executed by a computer or microprocessor or the like. Within the spirit and scope of the invention, the program that performs the functions of the invention as described and illustrated herein may take the form of firmware or hardware.

Those of skill in the art also will appreciate that any and all suitable means for performing the described functions and achieving the desired results in accordance with the invention are contemplated as being within the spirit and scope of the invention.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. An electronic method for handling telephone calls comprising:

storing in a memory one or more telephone number templates, each template being as wide as a telephone number is long, each template including a mask identifying one or more telephone number positions within a telephone number field for comparison purposes, each mask capable of identifying one or more telephone number positions within a telephone number field whether such positions are at the beginning, in the middle or at the end thereof, each template further including a target identifying one or more telephone number tokens within a telephone number field for comparison purposes;

monitoring a telephone line for a call placed thereon;

identifying at least one of the origin and the destination telephone number and storing one or more tokens of such identified telephone number in a memory;

comparing the stored tokens of the identified telephone number with the corresponding target tokens within the identified positions of at least one of the one or more stored templates; and processing the call based upon the result of said comparing.

2. The method of claim 1 wherein said processing includes logging the call.

3. The method of claim 1 wherein said processing includes screening the call.

4. The method of claim 3 wherein said screening includes ignoring the call.

5. The method of claim 1 wherein said processing includes rerouting the call.

6. The method of claim 1 wherein said processing includes forwarding the call.

7. The method of claim 1 wherein said processing includes distinctive-ringing the call.

8. The method of claim 1 wherein said processing includes answering the call.

9. The method of claim 1 wherein the template includes a mask-identifying digit position criterion and a target-identifying digit content criterion, the position and content criteria being represented by alphanumeric fields stored in the memory.

10. An automatic telephone call handling method comprising:

monitoring a telephone line identifiable to an origin telephone number for entry by a caller of a destination telephone number;

comparing at least one of the origin and destination telephone numbers with an address template stored in a memory, the address template being a two-level logic device including a mask identifying one or more digit positions of significance and a-target identifying a telephone number of significance, each mask capable of identifying one or more digit positions of significance whether such positions are at the beginning, in the middle or at the end thereof;

processing the call based upon the result of said comparing, said processing including one of blocking, filtering, routing, forwarding, distinctive-ringing and answering the call; and logging at least one of the origin and destination telephone numbers in a memory, said logging being performed selectively based upon the result of said comparing.

11. The method of claim 10 wherein said comparing is performed by pattern matching.

12. The method of claim 11 wherein said stored address template includes a telephone number mask identifying position-defined digits within the origin or destination telephone number for said pattern matching.

13. The method of claim 12 wherein said stored address template includes one or more telephone number targets enumerating content-defined digits within the origin or destination telephone number for said pattern matching.

14. The method of claim 13 wherein said pattern matching includes using the telephone number mask to select only those digits of interest in the origin or destination telephone number for comparison with the telephone number target.

15. The method of claim 14 wherein said pattern matching further includes determining whether there is identity between those digits of interest in the origin or destination telephone number and corresponding digits of one of the telephone number targets.

16. The method of claim 15 wherein said processing is performed only when it is determined there is such identity.

17. The method of claim 15 wherein said logging is performed only when it is determined there is such identity.

18. Telephone call-handling apparatus comprising:

a telephone line monitor for determining at least one of a source and destination telephone number for a telephone call;

a telephone number storage device for storing the at least one of the source and destination telephone number;

a template storage device for pattern matching with the at least one stored telephone number, said template including a mask for defining one or more sub-fields of interest in the stored telephone number, each mask capable of identifying one or more sub-fields of interest whether such sub-fields are positioned at the beginning, in the middle or at the end of the stored telephone number, said template furthers including a target for comparing said one or more sub-fields of interest in the target with corresponding sub-fields of the stored telephone number; and a call processor coupled with said template storage device for selectively processing the telephone call based upon the result of such comparison.

19. The apparatus of claim 18 wherein said call processor includes any one or more of a call blocker, filter, router, forwarder, distinctive-ringer, answerer and logger.

20. A computer-readable medium containing a program for handling telephone calls, the program comprising:

instructions for storing in a memory one or more telephone number templates, each template being as wide as a telephone number is long, each template including a mask identifying one or more telephone number positions within a telephone number field for comparison purposes, each mask capable of identifying one or more telephone number positions within a telephone number field whether such positions are at the beginning, in the middle or at the end thereof, each template further including a target identifying one or more telephone number digits within a telephone number field for comparison purposes;

instructions for monitoring a telephone line for a call placed thereon;

instructions for identifying at least one of the origin and the destination telephone number and storing one or more digits of such identified telephone number in a memory;

instructions for comparing the stored digits of the identified telephone number with the corresponding target digits within the identified positions of at least one of the one or more stored templates; and instructions for processing the call based upon the result of said comparing.

21. A method of screening telephone calls comprising:

monitoring a telephone call and storing in memory an entire dialing sequence of ordered dial tokens as a dial token field;

classifying the telephone call by analyzing only those dial token sub-fields within the stored dial token field that meet predefined position and content criteria, said classifying including logically combining a stored mask/target pair thereby to mask don't care digits within a target telephone number and comparing the remaining complement of digits to corresponding digits of the dial token field, wherein a mask of each mask/target pair is capable of identifying one or more dial token sub-fields within the stored dial token field whether such positions are at the beginning, in the middle or at the end thereof; and selectively processing the telephone call based upon said classifying, wherein said processing includes one of blocking, filtering, routing, forwarding, distinctive-ringing and answering the call.

22. The method of claim 21 wherein said analyzing is performed by masking the dial token field to identify dial token sub-fields of interest and comparing the dial token sub-fields of interest with corresponding telephone number target sub-fields stored in memory.

* * * * *

UNITED STATES PATENT AND TRADEMARK OFFICE
CERTIFICATE OF CORRECTION

PATENT NO. : 6,741,688 B1
DATED : May 25, 2004
INVENTOR(S) : Yau

It is certified that error appears in the above-identified patent and that said Letters Patent is hereby corrected as shown below:

Column 8,
Line 33, "don't care caller" should read -- don't-care caller --.

Column 9,
Line 61, "input 25 token string" should read -- input token string --.

Column 10,
Line 2, "product 30 output by" should read -- product output by --.

Column 11,
Line 46, "and a-target identifying" should read -- and a target identifying --.

Column 12,
Line 28, "template futhers including" should read -- template further including --.

Signed and Sealed this

Twenty-sixth Day of October, 2004

JON W. DUDAS
*Director of the United States Patent and Trademark Office*